(12) United States Patent
Ichimoto et al.

(10) Patent No.: US 6,965,824 B2
(45) Date of Patent: Nov. 15, 2005

(54) POWER OUTPUT APPARATUS AND AUTOMOBILE WITH POWER OUTPUT APPARATUS MOUNTED THEREON

(75) Inventors: Kazuhiro Ichimoto, Nisshin (JP); Osamu Harada, Toyota (JP); Yukio Kobayashi, Kasugai (JP); Katsuhiko Yamaguchi, Nisshin (JP); Kiyoshiro Ueoka, Nisshin (JP); Takahiro Nishigaki, Nagoya (JP); Makoto Yamazaki, Gotenba (JP); Mamoru Tomatsuri, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/964,896

(22) Filed: Oct. 15, 2004

(65) Prior Publication Data

US 2005/0082097 A1 Apr. 21, 2005

(30) Foreign Application Priority Data

Oct. 21, 2003 (JP) .............................. 2003-360643

(51) Int. Cl.[7] .............................................. B60K 6/00
(52) U.S. Cl. ...................... 701/113; 180/65.2; 701/102
(58) Field of Search ........................ 701/113, 22, 102, 701/115; 180/65.2, 65.3; 477/3

(56) References Cited

U.S. PATENT DOCUMENTS

| 5,722,911 A | * | 3/1998 | Ibaraki et al. ................. 477/3 |
| 5,973,460 A | * | 10/1999 | Taga et al. .................. 318/139 |
| 6,878,093 B2 | * | 4/2005 | Fukushima et al. ............ 477/3 |

FOREIGN PATENT DOCUMENTS

| JP | 09-140006 | 5/1997 |
| JP | 2002-213592 | 7/2002 |

* cited by examiner

Primary Examiner—Hieu T. Vo
(74) Attorney, Agent, or Firm—Kenyon & Kenyon (57) ABSTRACT

The control technique of the invention sets smaller values to an engine stop reference value and an engine start reference value in the state of use of a regular fuel, compared with values in the ordinal state. When a calculated engine power demand Pe* is less than the engine stop reference value, the control stops the operation of the engine. When the calculated engine power demand Pe* exceeds the engine start reference value, on the other hand, the control starts the operation of the engine. This arrangement facilitates the start of the engine in the state of use of the regular fuel, compared with the start in the ordinary state. A corrective revolution speed ΔN is added to a target revolution speed Ne* of the engine, in order to respond to a decrease in output power from the internal combustion engine.

19 Claims, 11 Drawing Sheets

POWER OUTPUT APPARATUS AND AUTOMOBILE WITH POWER OUTPUT APPARATUS MOUNTED THEREON

BACKGROUND OF THE INVENTION

1. Field of the Invention

The present invention relates to a power output apparatus, an automobile with the power output apparatus mounted thereon, and a control method of the power output apparatus.

2. Description of the Prior Art

A proposed power output apparatus sets the higher revolution speed of an engine to ensure the output power from the engine, in response to a decrease in output torque from the engine due to, for example, knocking control of the engine (see, for example, Japanese Patent Laid-Open Gazette No. 2002-213592).

SUMMARY OF THE INVENTION

This prior art power output apparatus sets the higher revolution speed of the engine in the process of knocking control. In some cases, however, the simple increase in revolution speed of the engine is insufficient. This temporary measure may sufficiently respond to a temporary and transient phenomenon, such as knocking of the engine. In the case of continuous decrease in engine output under normal control, for example, in the case of use of a wrong fuel or in the case of a change in heat value of an ignition plug, however, this measure does not work adequately. Especially in a hybrid vehicle, a decrease in engine output undesirably increases the load of the electric system and adversely affects the other systems. It is thus required to maintain the engine output at a sufficiently high level.

A power output apparatus of the invention, an automobile with the power output apparatus mounted thereon, and a control method of the power output apparatus thus aim to adequately respond to a decrease in power output from an internal combustion engine. The power output apparatus of the invention, an automobile with the power output apparatus mounted thereon, and a control method of the power output apparatus also aim to ensure a sufficient output level from the internal combustion engine.

At least part of the above and the other related objects of the invention is attained by a power output apparatus discussed below, as well as by a control method of the power output apparatus and an automobile with the power output apparatus mounted thereon.

The power output apparatus of the invention is the power output apparatus that outputs power to a drive shaft, and the power output apparatus includes: an internal combustion engine; an electric power-mechanical power input-output module that is connected to an output shaft of the internal combustion engine and to the drive shaft and outputs at least part of output power from the internal combustion engine to the drive shaft through input and output of electric power and mechanical power; a motor that inputs and outputs power from and to the drive shaft; a target drive point setting module that sets a target drive point of the internal combustion engine, based on a power demand required to the drive shaft; an output decrease detection module that detects an output decreasing state, where the output power from the internal combustion engine is lower than a power level defined by the target drive point, while the internal combustion engine is under a preset control to be driven at the target drive point; and a control module that controls the internal combustion engine, the electric power-mechanical power input-output module, and the motor with a predetermined control parameter, in the case of no detection of the output decreasing state by the output decrease detection module, while correcting the predetermined control parameter to increase the output power from the internal combustion engine, in the case of detection of the output decreasing state by the output decrease detection module, and controlling the internal combustion engine, the electric power-mechanical power input-output module, and the motor with the corrected control parameter.

In response to detection of the output decreasing state, where the output power from the internal combustion engine is lower than the power level defined by the target drive point, the power output apparatus of the invention corrects the predetermined control parameter to increase the output power from the internal combustion engine, and controls the internal combustion engine, the electric power-mechanical power input-output module, and the motor. In the event of a decrease in output power from the internal combustion engine, the power output apparatus of the invention accordingly controls the internal combustion engine, the electric power-mechanical power input-output module, and the motor to increase the output power from the internal combustion engine. Here the terminology 'output decreasing state' represents the state of lowered power output from the internal combustion engine in some driving environment or conditions of the internal combustion engine or in the state of use of a non-specified fuel, for example, in the state of use of a fuel having a lower octane value than an expected octane value of a specified fuel.

In one preferable embodiment of the power output apparatus of the invention, the control module may control a start of the internal combustion engine with a preset start reference value, and correct the preset start reference value to facilitate the start of the internal combustion engine, in response to detection of the output decreasing state by said output decrease detection module, compared with a state of no detection of the output decreasing state. The control module may also control a stop of the internal combustion engine with a preset stop reference value, and correct the preset stop reference value to hinder the stop of the internal combustion engine, in response to detection of the output decreasing state by said output decrease detection module, compared with a state of no detection of the output decreasing state.

In the power output apparatus of the invention, the target drive point setting module may set a target revolution speed and a target torque of the internal combustion engine as the target drive point, and the control module may correct the target revolution speed of the internal combustion engine to a greater value, in response to detection of the output decreasing state by the output decrease detection module, compared with a state of no detection of the output decreasing state. In this case, the control module may correct the target revolution speed of the internal combustion engine to make a difference between the non-corrected target revolution speed of the internal combustion engine and the corrected target revolution speed of the internal combustion engine within a specified range.

Further, in the power output apparatus of the invention, the control module may correct an opening of a throttle valve in the internal combustion engine to a greater value, in response to detection of the output decreasing state by the output decrease detection module, compared with a state of no detection of the output decreasing state. In this case, the control module may correct the opening of the throttle valve in the internal combustion engine to make a difference between the non-corrected opening of the throttle valve and the corrected opening of the throttle valve within a specified range.

In the power output apparatus of the invention, the output decrease detection module may sense a start of knocking control of the internal combustion engine to detect the output decreasing state.

Moreover, in the power output apparatus of the invention, the electric power-mechanical power input-output module may include: a three shaft-type power input-output unit that is connected to three shafts, the output shaft of the internal combustion engine, the drive shaft, and a third shaft, and inputs and outputs power from and to a residual shaft, based on powers input from and output to any two of the three shafts; and a generator that inputs and outputs power from and to the third shaft.

In the power output apparatus of the invention, the electric power-mechanical power input-output module may include a pair-rotor motor, which has a first rotor linked with the output shaft of the internal combustion engine and a second rotor linked with the drive shaft, and outputs at least part of the output power from the internal combustion engine to the drive shaft through input and output of electric power by an electromagnetic action of the first rotor and the second rotor.

The technique of the invention is not restricted to the power output apparatus discussed above, but is also actualized by a control method of such a power output apparatus, as well as by an automobile with such a power output apparatus mounted thereon.

DESCRIPTION OF THE PREFERRED EMBODIMENTS

Figure 1:
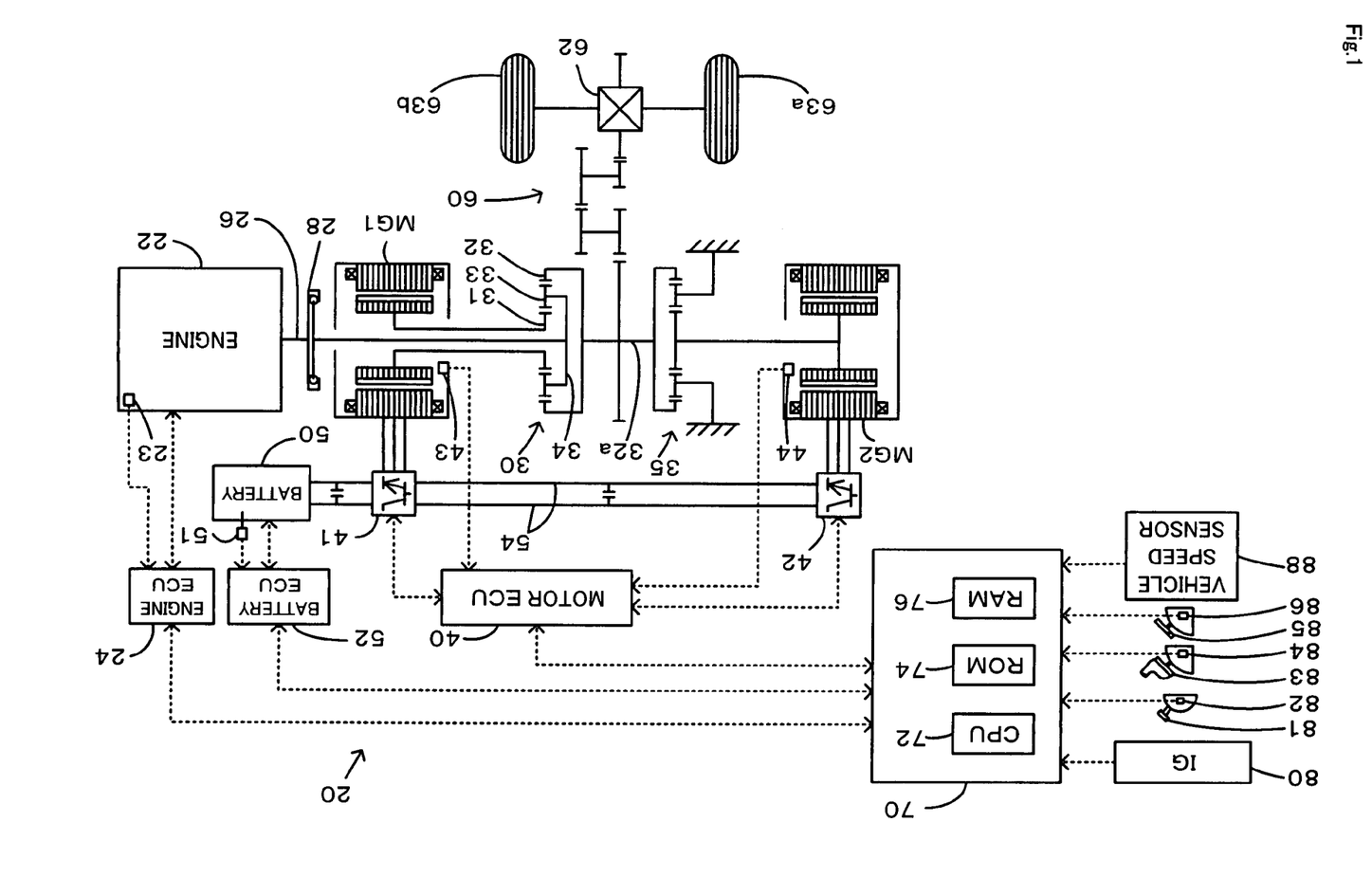
FIG. 1 schematically illustrates the configuration of a hybrid vehicle 20 in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The diverse sensors used to detect and measure the driving conditions of the engine 22 include, for example, a knocking sensor 23 that detects the occurrence of knocking in the engine 22 and a water temperature sensor (not shown) that measures the temperature of cooling water (cooling water temperature) in the engine 22. The engine ECU 24 communicates with a hybrid electronic control unit 70 and controls the operations of the engine 22 in response to control signals sent from the hybrid electronic control unit 70, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
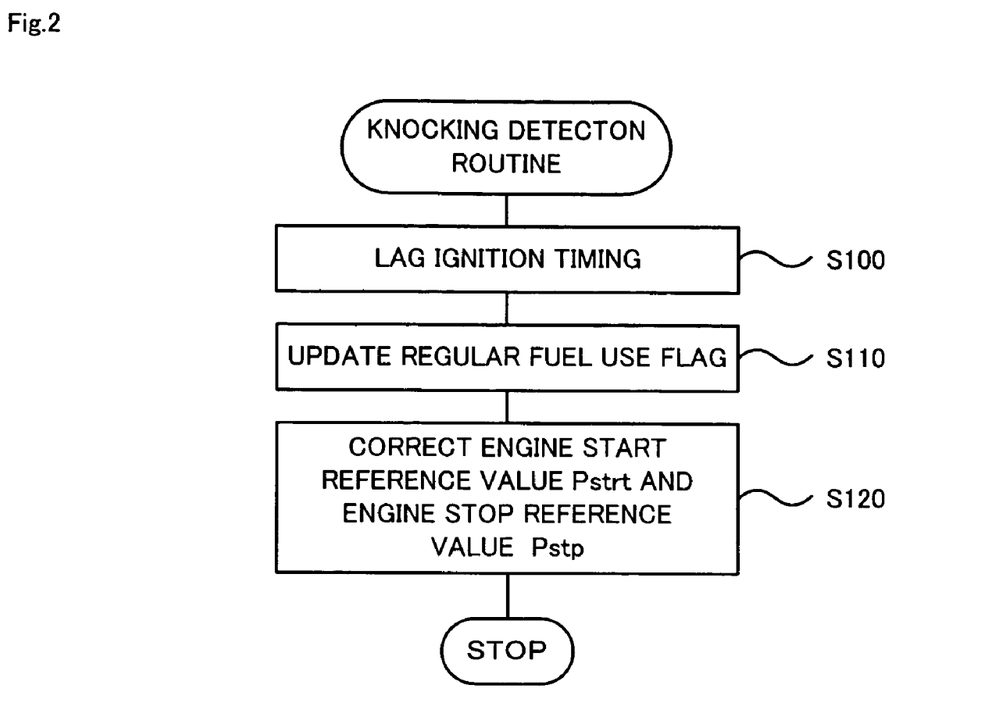
FIG. 2 is a flowchart showing a knocking detection routine executed by an engine ECU 24 in the embodiment.

The following describes the operations of the hybrid vehicle 20 of the embodiment constructed as discussed above. The description first regards a series of processing in response to the occurrence of knocking in the engine 22 and then a series of processing to output a driving force corresponding to the driver's step-on amount of the accelerator pedal 83 to the ring gear shaft 32a or the drive shaft. FIG. 2 is a flowchart showing a knocking detection routine executed by the engine ECU 24. This routine is triggered by input of a knocking detection signal sent from the knocking sensor 23.

When the knocking detection routine starts, the engine ECU 24 first lags the ignition timing of the engine 22 to restrict the occurrence of knocking (step S100), and identifies the use of a regular fuel having a lower octane value than an expected octane value of a specified fuel and updates the value of a regular fuel use flag (step S110). According to the concrete procedure of this embodiment, the engine ECU 24 sends a command signal to update the regular fuel use flag to the hybrid electronic control unit 70. The hybrid electronic control unit 70 receives the command signal and updates the value of the regular fuel use flag stored in the RAM 76.

Figure 3:
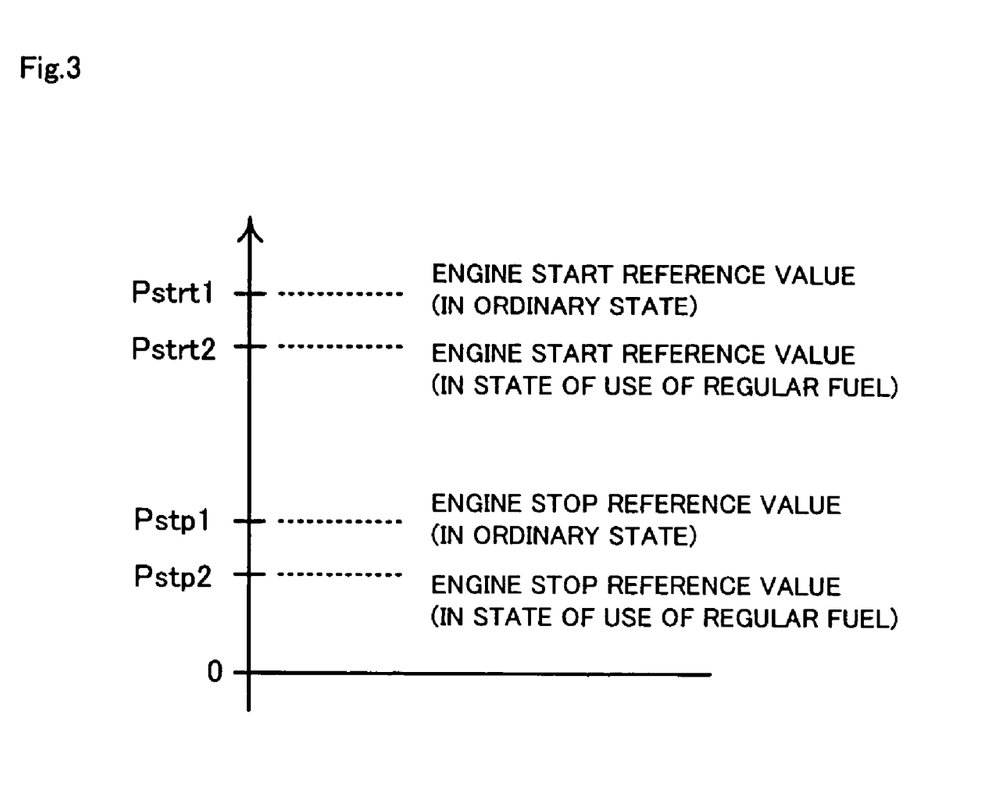
FIG. 3 shows differences of an engine start reference value Pstrt and an engine stop reference value Pstp in the ordinary state and in the state of use of a regular fuel.

The engine ECU 24 subsequently corrects an engine start reference value Pstrt and an engine stop reference value Pstp, which are used to determine a start and a stop of the engine 22, to those in the state of use of the regular fuel (step S120), before terminating the knocking detection routine. FIG. 3 shows differences of the engine start reference value Pstrt and the engine stop reference value Pstp in the ordinary state and in the state of use of the regular fuel. As shown in the graph of FIG. 3, smaller values (Pstrt2 and Pstp2) are set to both the engine start reference value and the engine stop reference value in the state of use of the regular fuel, compared with settings (Pstrt1 and Pstp1) in the ordinary state. A drive control routine (discussed below) compares a power demand required for the engine 22 with these engine start reference value Pstrt and engine stop reference value Pstp to determine a start and a stop of the engine 22.

Figure 4:
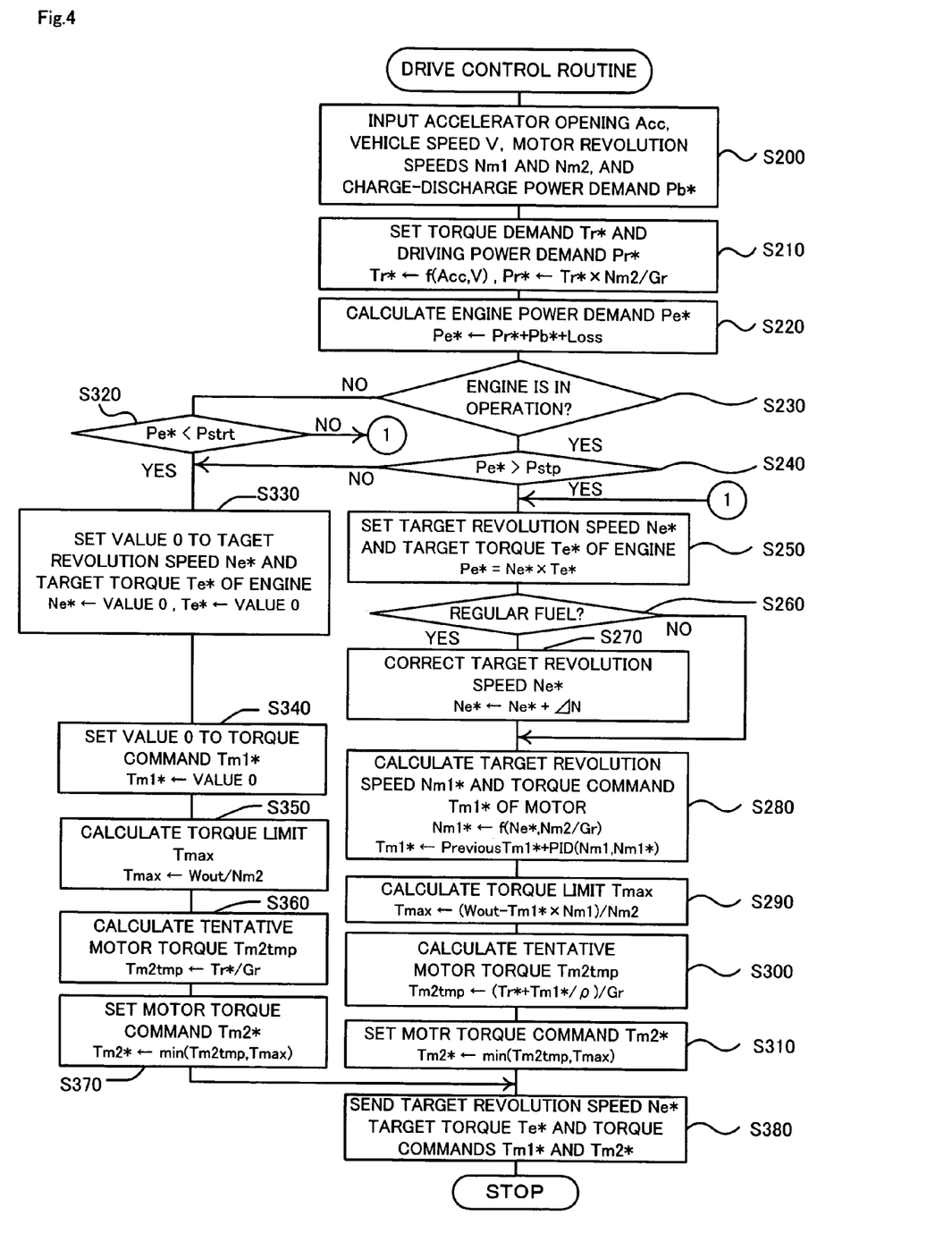
FIG. 4 is a flowchart showing a drive control routine executed by a hybrid electronic control unit 70 in the embodiment.

The description now regards a series of processing to output the driving force to the ring gear shaft 32a. FIG. 4 is a flowchart showing a drive control routine executed by the hybrid electronic control unit 70. This routine is carried out repeatedly at preset time intervals (for example, at every 8 msec).

When the drive control routine starts, the CPU 72 of the hybrid electronic control unit 70 first inputs various data required for control, that is, the accelerator opening Acc from the accelerator pedal position sensor 84, the vehicle speed V from the vehicle speed sensor 88, revolution speeds Nm1 and Nm2 of the motors MG1 and MG2, and a charge-discharge power demand Pb* of the battery 50 (step S200). The revolution speeds Nm1 and Nm2 of the motors MG1 and MG2 are computed from rotational positions of rotors in the motors MG1 and MG2 detected by rotational position detection sensors 43 and 44 and are input from the motor ECU 40 via communication. The charge-discharge power demand Pb* is specified by the battery ECU 52 according to a preset map and is input from the battery ECU 52 via communication. The preset map gives a greater discharging power with an increase in state of charge (SOC) of the battery 50 when the state of charge (SOC) is higher than a reference level, while giving a greater charging power with a decrease in state of charge (SOC) when the state of charge (SOC) is lower than the reference level.

Figure 5:
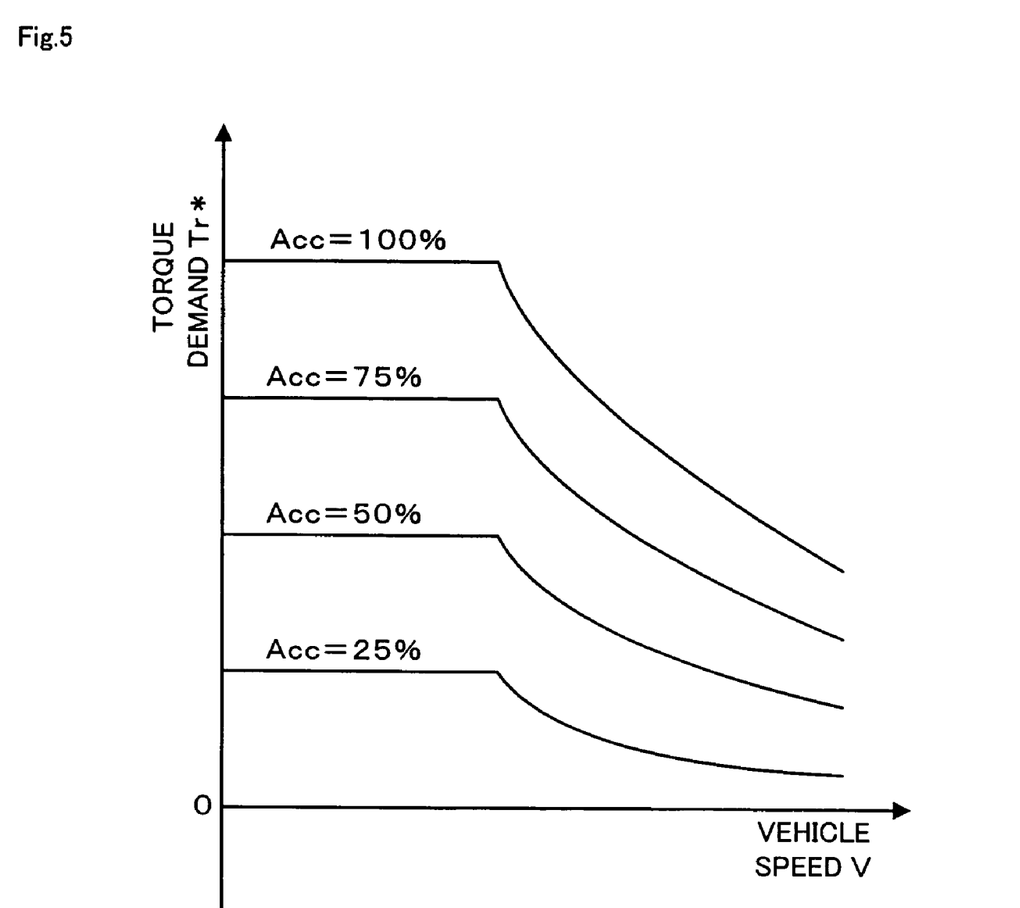
FIG. 5 shows a torque demand setting map.

After the input of these data, the CPU 72 sets a torque demand Tr* to be output to the ring gear shaft 32a or the drive shaft linked with the drive wheels 63a and 63b as the torque required for the vehicle and a driving power demand Pr* as the driving power to be output to the ring gear shaft 32a, based on the inputs of the accelerator opening Acc and the vehicle speed V (step S210). In the structure of this embodiment, variations in torque demand Tr* against the accelerator opening Acc and the vehicle speed V are specified in advance and stored as a torque demand setting map in the ROM 74. The procedure of the embodiment reads and sets the torque demand Tr* corresponding to the given accelerator opening Acc and the given vehicle speed V from the stored torque demand setting map. FIG. 5 shows an example of the torque demand setting map. The driving power demand Pr* is calculated by multiplying the setting of the torque demand Tr* by a revolution speed Nr of the ring gear shaft 32a. The revolution speed Nr of the ring gear shaft 32a may be obtained by multiplying the vehicle speed V by a conversion coefficient k or by dividing the revolution speed Nm2 of the motor MG2 by a gear ratio Gr of the reduction gear 35.

After setting the torque demand Tr* and the driving power demand Pr*, the CPU 72 sums up the setting of the driving power demand Pr*, the input charge-discharge power demand Pb*, and a potential loss Loss to calculate an engine power demand Pe*, which is to be output from the engine 22 as a total power demand required by the vehicle (step S220). The CPU 72 determines whether the engine 22 is in operation (step S230). In the working state of the engine 22, the engine power demand Pe* calculated at step S220 is compared with the engine stop reference value Pstp (step S240). The procedure of this embodiment stops operation of the engine 22 when the calculated engine power demand Pe* is not greater than the engine stop reference value Pstp in the working state of the engine 22. As shown in FIG. 3, the engine stop reference value Pstp2 in the state of use of the regular fuel is smaller than the engine stop reference value Pstp1 in the ordinal state. In the state of use of the regular fuel, the engine 22 does not stop but continues driving even when a relatively small value is set to the engine power demand Pe*.

Figure 6:
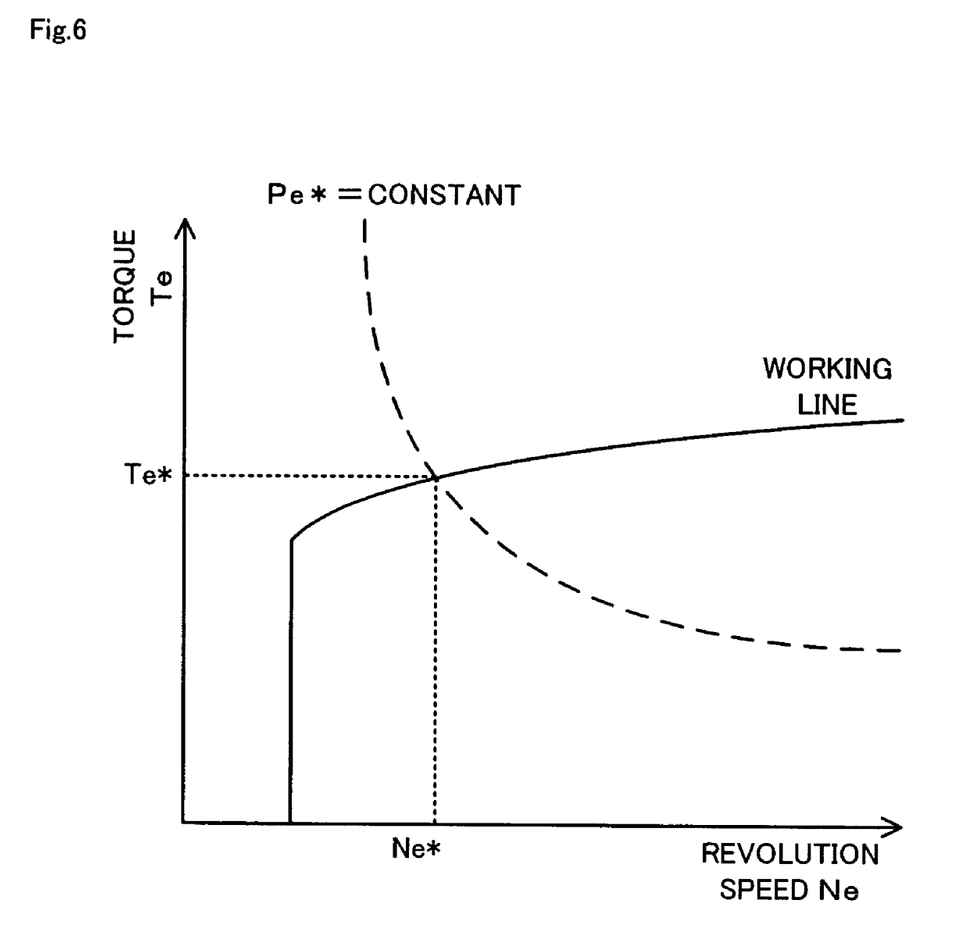
FIG. 6 shows a working line of an engine 22 and settings of a target revolution speed Ne* and a target torque Te*.

When the calculated engine power demand Pe* is greater than the engine stop reference value Pstp, the CPU 72 identifies no requirement of stopping the operation of the engine 22, and sets a target revolution speed Ne* and a target torque Te* of the engine 22, based on the calculated engine power demand Pe* (step S250). One concrete procedure sets the target revolution speed Ne* and the target torque Te* by taking into account the calculated engine power demand Pe* and an estimated working line on which the engine 22 is driven with high efficiency. FIG. 6 shows a working line of the engine 22 and settings of the target revolution speed Ne* and the target torque Te*. As shown in the graph of FIG. 6, an intersection of the working line and a constant curve of the engine power demand Pe* (=Ne*×Te*) gives the target revolution speed Ne* and the target torque Te*.

Figure 7:
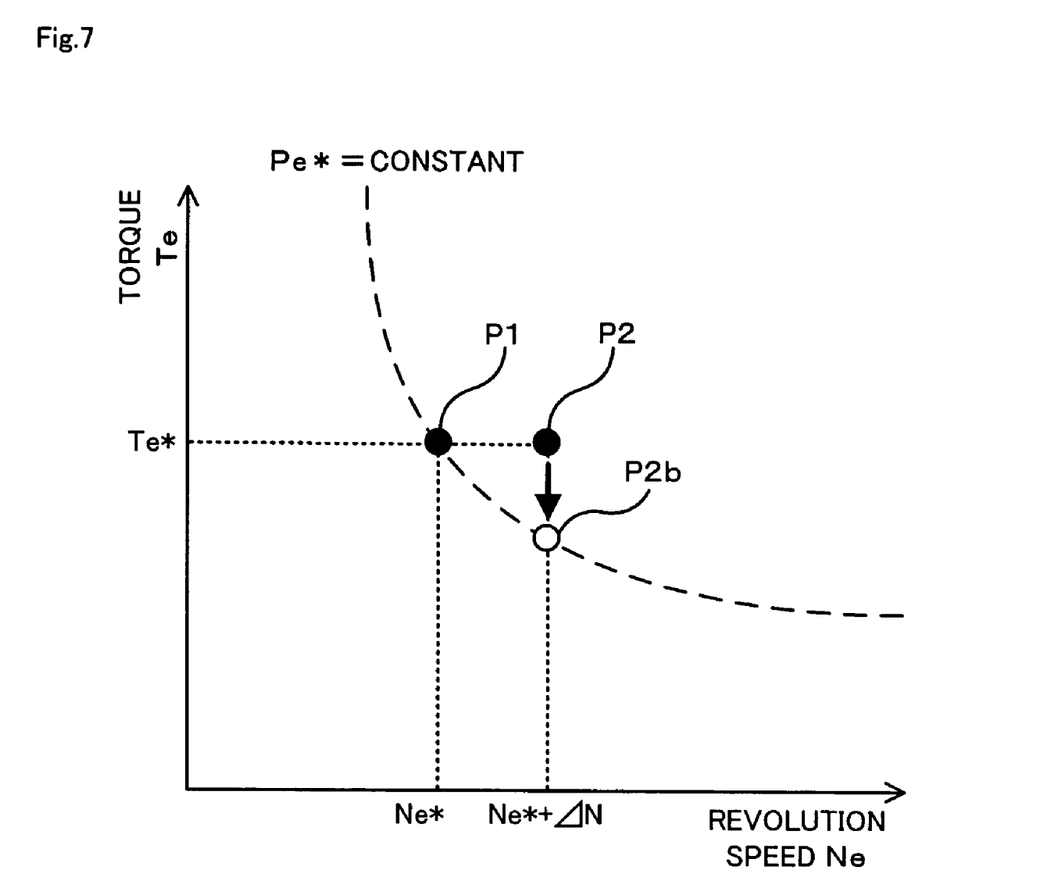
FIG. 7 shows addition of a corrective revolution speed $\Delta N$.

In the state of use of the regular fuel, the CPU 72 adds a corrective revolution speed ΔN to the setting of the target revolution speed Ne* (steps S260 and S270). FIG. 7 shows addition of the corrective revolution speed ΔN. As shown in FIG. 7, the engine 22 is controlled to be driven at a corrected target drive point P2, which is set by adding the corrective revolution speed ΔN to the target revolution speed Ne* at a target drive point P1 set at step S250. Since knocking control (lag of the ignition timing) lowers the torque output from the engine 22 in the state of use of the regular fuel, the engine 22 is actually driven at a drive point P2b having a smaller torque than the target torque Te*. One concrete procedure of the embodiment experimentally or otherwise specifies the corrective revolution speed ΔN to make the output power at the target drive point substantially equal to the output power at the actual drive point.

Figure 8:
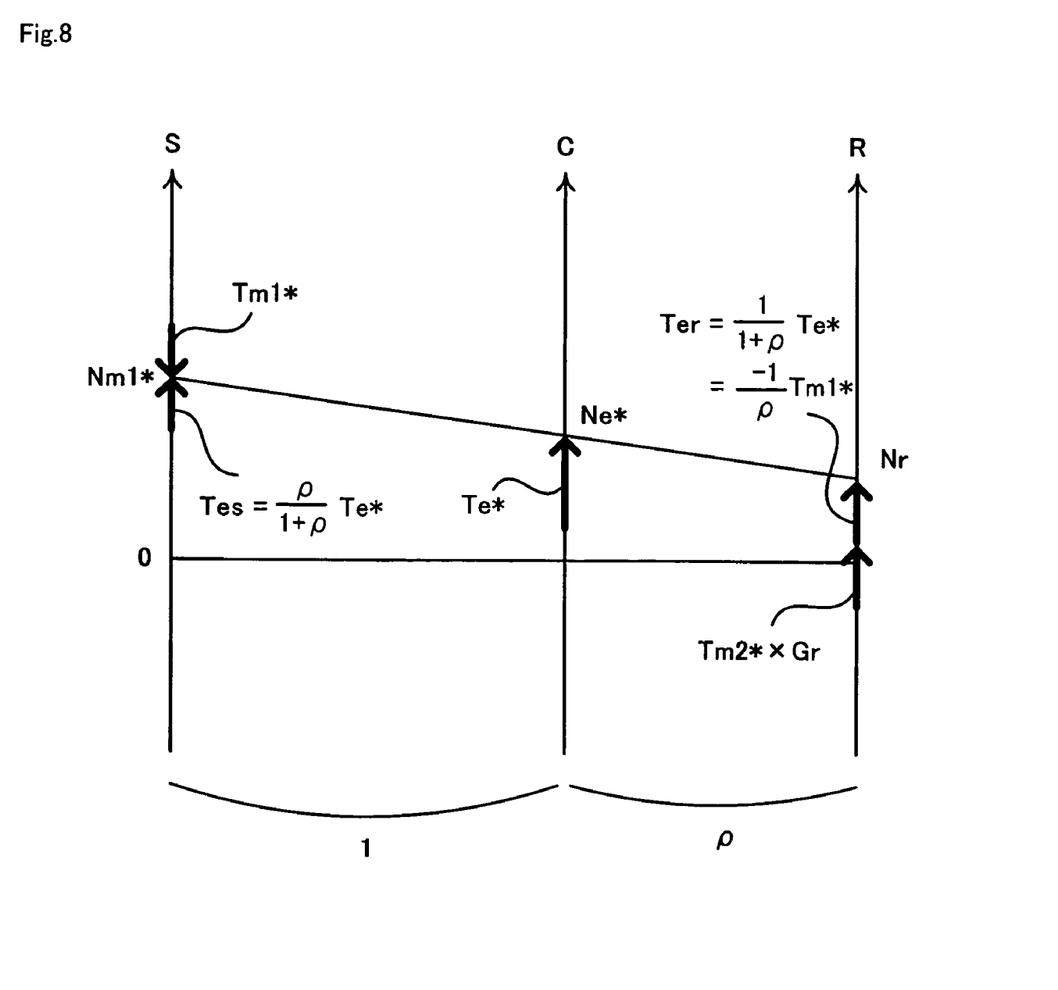
FIG. 8 is a collinear chart for dynamic explanation of rotational elements of a power distribution integration mechanism 30 in a torque conversion drive mode and in a charge-discharge drive mode.

The CPU 72 subsequently calculates a target revolution speed Nm1* of the motor MG1 from the setting of the target revolution speed Ne*, the revolution speed Nr (=Nm2/Gr) of the ring gear shaft 32a, and the gear ratio ρ of the power distribution integration mechanism 30 according to Equation (1) given below, and calculates the torque command Tm1* of the motor MG1 from the calculated target revolution speed Nm1* and the current revolution speed Nm1 of the motor MG1 according to Equation (2) given below (step S280). Equation (1) shows a dynamic relation of the rotational elements in the power distribution integration mechanism 30. FIG. 8 is an alignment chart showing a dynamic relation between the revolution speed and the torque with respect to the rotational elements in the power distribution integration mechanism 30. In the collinear chart of FIG. 8, the axis S represents the revolution speed of the sun gear 31, which is equivalent to the revolution speed Nm1 of the motor MG1. The axis C represents the revolution speed of the carrier 34, which is equivalent to the revolution speed Ne of the engine 22. The axis R represents the revolution speed Nr of the ring gear 32, which is the product of the revolution speed Nm2 of the motor MG2 and the gear ratio Gr of the reduction gear 35. Equation (1) is easily derived from this alignment chart. Two thick arrows on the axis R respectively represent a torque acting on the ring gear shaft 32a as the torque Te* output from the engine 22 is transmitted via the power distribution integration mechanism 30 while the engine 22 is steadily driven at a specific drive point defined by the target torque Te* and the target revolution speed Ne*, and a torque acting on the ring gear shaft 32a as the torque Tm2* output from the motor MG2 is transmitted via the reduction gear 35. Equation (2) shows a relation in feedback control to rotate the motor MG1 at the target revolution speed Nm1*. In Equation (2), 'k1' in the second term on the right side represents a gain of a proportional term and 'k2' in the third term on the right side represents a gain of an integral term.

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2 \int (Nm1^* - Nm1)dt \quad (2)$$

After calculation of the target revolution speed Nm1* and the torque command Tm1* of the motor MG1, the CPU 72 divides a difference between the output restriction Wout of the battery 50 and a power consumption (generated power) of the motor MG1, which is the product of the calculated torque command Tm1* of the motor MG1 and the current revolution speed Nm1 of the motor MG1, by the current revolution speed Nm2 of the motor MG2 according to Equation (3) given below to calculate the torque limit Tmax as the upper limit torque output from the motor MG2 (step S290). The CPU 72 also calculates the tentative motor torque Tm2tmp as the torque to be output from the motor MG2 from the torque demand Tr*, the torque command Tm1*, and the gear ratio ρ of the power distribution integration mechanism 30 according to Equation (4) given below (step S300), and sets the smaller between the calculated torque limit Tmax and the calculated tentative motor torque Tm2tmp to the torque command Tm2* of the motor MG2 (step S310). Setting the torque command Tm2* of the motor MG2 in this manner enables the torque demand Tr*, which is to be output to the ring gear shaft 32a or the drive shaft, to be set as the limited torque within the range of the output restriction of the battery 50. Equation (4) is easily derived from the alignment chart of FIG. 8 discussed above.

$$T\text{max} = (W\text{out} - Tm1^* \cdot Nm1)/Nm2 \quad (3)$$

$$Tm2tmp = (Tr^* + Tm1^*/\rho)/Gr \quad (4)$$

After setting the target revolution speed Ne* and the target torque Te* of the engine 22 and the torque commands Tm1* and Tm2* of the motors MG1 and MG2, the CPU 72 sends the target revolution speed Ne* and the target torque Te* of the engine 22 to the engine ECU 24 and the torque commands Tm1* and Tm2* of the motors MG1 and MG2 to the motor ECU 40 (step S380) and exits from this drive control routine. The engine ECU 24 receives the target revolution speed Ne* and the target torque Te* and carries out fuel injection control and ignition control to drive the engine 22 at the target drive point defined by the target revolution speed Ne* and the target torque Te*. The motor ECU 40 receives the torque commands Tm1* and Tm2* and carries out switching control of the switching elements included in the inverters 41 and 42 to operate the motor MG1 with the torque command Tm1* and the motor MG2 with the torque command Tm2*, respectively.

When the calculated engine power demand Pe* is not greater than the engine stop reference value Pstp at step S240, on the other hand, the CPU 72 identifies a requirement of stopping the engine 22 and driving the hybrid vehicle 20 in a motor drive mode, and sets a value '0' to the target revolution speed Ne* and the target torque Te* of the engine 22 and to the torque command Tm1* of the motor MG1 (steps S330 and S340). The CPU 72 subsequently divides the output limit Wout of the battery 50 by the revolution speed Nm2 of the motor MG2 to calculate the torque limit Tmax or the upper torque limit output from the motor MG2 according to Equation (5) given below (step S350). The CPU 72 also divides the torque demand Tr* by the gear ratio Gr of the reduction gear 35 to calculate the tentative motor torque Tm2tmp or the torque to be output from the motor MG2 according to Equation (6) given below (step S360). The CPU 72 compares the calculated torque limit Tmax with the calculated tentative motor torque Tm2tmp and sets the smaller to the torque command Tm2* of the motor MG2 (step S370). Setting the torque command Tm2* of the motor MG2 in this manner determines the torque demand Tr* to be output to the ring gear shaft 32a or the drive shaft, as the restricted torque in the range of the output limit Wout of the battery 50.

$$T\text{max} = W\text{out}/Nm2 \quad (5)$$

$$Tm2tmp = Tr^*/Gr \quad (6)$$

After setting the target revolution speed Ne* and the target torque Te* of the engine 22 and the torque commands Tm1* and Tm2* of the motors MG1 and MG2, the CPU 72 sends the target revolution speed Ne* and the target torque Te* of the engine 22 to the engine ECU 24 and the torque commands Tm1* and Tm2* of the motors MG1 and MG2 to the motor ECU 40 (step S380) and exits from this drive control routine. The engine ECU 24 receives the target revolution speed Ne* and the target torque Te*, which are both set equal to 0, and stops fuel injection control and ignition control to stop the operation of the engine 22. The motor ECU 40 receives the torque commands Tm1* and Tm2* and carries out switching control of the six switching elements included in the inverter 41 to make the output torque of the motor MG1 equal to zero, while carrying out switching control of the six switching elements included in the inverter 42 to make the output torque of the motor MG2 equal to the torque command Tm2*.

When it is determined at step S230 that the engine 22 is at a stop, the engine power demand Pe* calculated at step S220 is compared with the engine start reference value Pstrt (step S320). The procedure of this embodiment starts the engine 22 when the calculated engine power demand Pe* exceeds the engine start reference value Pstrt in the stop state of the engine 22. As shown in FIG. 3, the engine start reference value Pstrt2 in the state of use of the regular fuel is smaller than the engine start reference value Pstrt1 in the ordinary state. This arrangement starts the engine 22 in the state of use of the regular fuel, even when a relatively small value is set to the engine power demand Pe*.

When the engine power demand Pe* is less than the engine start reference value Pstrt, the CPU 72 identifies no requirement of starting the engine 22 and executes the series of processing of and after step S330, before terminating the drive control routine. When the engine power demand Pe* is not less than the engine start reference value Pstrt, on the other hand, the CPU 72 identifies a requirement of starting the engine 22 and executes the series of processing of and after step S250, before terminating the drive control routine. The series of processing of and after step S330 and the series of processing of and after step S250 have been discussed above in detail.

As described above, the hybrid vehicle 20 of the embodiment corrects the engine start reference value Pstrt and the engine stop reference value Pstp to the smaller values in the state of use of the regular fuel, compared with the values in the ordinary state. The hybrid vehicle 20 thus does not stop the engine 22 but continues driving the engine 22 or starts the engine 22 from the stop state, even when a relatively small value is set to the engine power demand Pe*. This arrangement raises the potential of driving the engine 22 and thereby assures the output power from the engine 22. In the state of use of the regular fuel, the corrective revolution speed ΔN is added to the target revolution speed Ne* of the engine 22. This ensures the output power from the engine 22.

A hybrid vehicle 20B in a second embodiment of the invention is described below. The hybrid vehicle 20B of the second embodiment has the identical configuration with that of the hybrid vehicle 20 of the first embodiment shown in FIG. 1. In order to avoid unnecessary duplication, the like elements of the hybrid vehicle 20B of the second embodiment to those of the hybrid vehicle 20 of the first embodiment are expressed by the like numerals and are not specifically described here. The following describes the characteristic operations of the hybrid vehicle 20B in the second embodiment.

Figure 9:
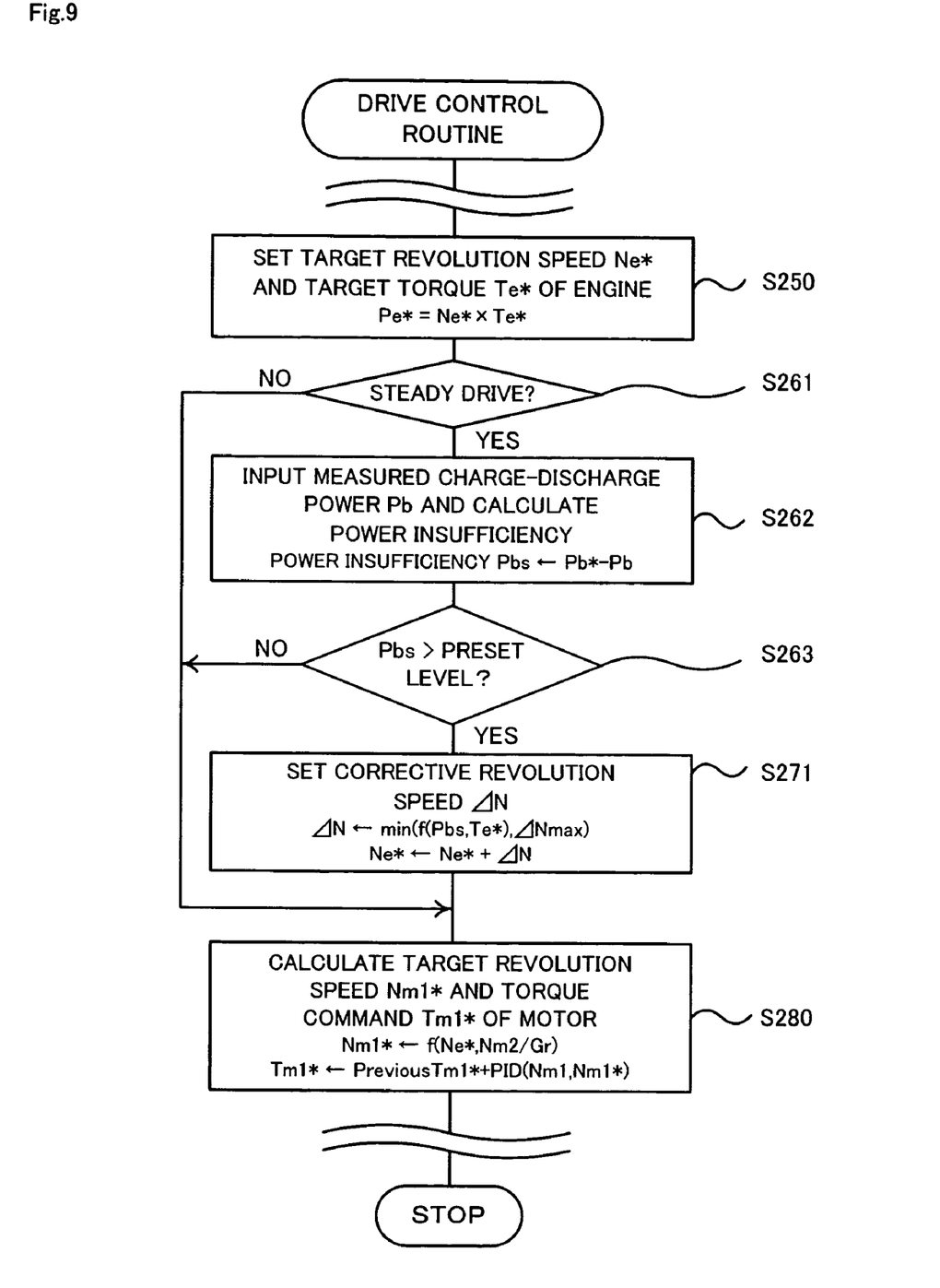
FIG. 9 is a flowchart showing a drive control routine executed by the hybrid electronic control unit 70 in a second embodiment of the invention.

FIG. 9 is a flowchart showing part of a drive control routine executed by the hybrid electronic control unit 70 in the second embodiment. The same steps as those in the drive control routine of the first embodiment shown in the flowchart of FIG. 4 are omitted from the flowchart of FIG. 9. The characteristic drive control routine of the second embodiment is described with reference to the flowchart of FIG. 9.

In the drive control routine of the second embodiment, after setting the target revolution speed Ne* and the target torque Te* of the engine 22 according to the calculated engine power demand Pe* at step S250, the CPU 72 determines whether the engine 22 is driven in the steady state (step S261). The procedure of the second embodiment determines whether a variation in repetitive setting of the torque command Tm1* of the motor MG1 is within a predetermined time and within a predetermined range, so as to determine whether the engine 22 is driven in the steady state. Any other suitable method may alternatively be adopted to determine whether the engine 22 is driven in the steady state.

When it is determined at step S261 that the engine 22 is driven in the steady state, the CPU 72 receives an actually measured charge-discharge power Pb of the battery 50 from the battery ECU 52 and subtracts the actually measured charge-discharge power Pb from the charge-discharge power demand Pb* input at step S200 to calculate a charge-discharge power insufficiency Pbs (step S262).

When the charge-discharge power insufficiency Pbs is greater than a preset level (step S263), the CPU 72 determines that the output from the engine 22 has been lowered and thereby adds the corrective revolution speed ΔN to the target revolution speed Ne* (step S271). It is determined that the output from the engine 22 has been lowered when the charge-discharge power insufficiency Pbs is greater than the preset level, because of the following reason. As shown in the collinear chart of FIG. 8, a decrease in torque Te* output from the engine 22 reduces the torques acting on the S axis and the R axis to decrease the power generation by the motor MG1 and increase the power consumption by the motor MG2. The procedure of the second embodiment guards the corrective revolution speed ΔN, which is calculated from the charge-discharge power insufficiency Pbs according to Equation (7), to a preset maximum value ΔNmax. The maximum value ΔNmax is set as an upper limit to prevent potential vibrations and noise, due to an excess change of the drive point.

$$\Delta N = Pbs/Te^* \quad (7)$$

After addition of the corrective revolution speed ΔN to the target revolution speed Ne*, like the drive control routine of the first embodiment, the CPU 72 calculates the target revolution speed Nm1* and the torque command Tm1* of the motor MG1 at step S280 and executes the subsequent series of processing of and after step S290, before terminating the drive control routine.

As described above, the hybrid vehicle 20B of the second embodiment determines that the output from the engine 22 has been lowered when the charge-discharge power insufficiency Pbs, which is calculated by subtracting the actually measured charge-discharge power Pb from the input charge-discharge power demand Pb*, is greater than the preset level. The corrective revolution speed ΔN is set according to the charge-discharge power insufficiency Pbs and is guarded by the preset maximum value ΔNmax. This latter arrangement desirably prevents potential vibrations and noise, due to an excess change of the drive point.

In the hybrid vehicle 20 of the first embodiment and the hybrid vehicle 20B of the second embodiment, the drive control routine corrects the engine start reference value Pstrt and the engine stop reference value Pstp to the smaller values and adds the corrective revolution speed ΔN to the target revolution speed Ne* of the engine 22. The drive control routine may carry out only one of such correction and addition. For example, the drive control routine may be modified to carry out only the correction of the engine start reference value Pstrt and the engine stop reference value Pstp. The drive control routine may alternatively be modified to carry out only the addition of the corrective revolution speed ΔN. A further modification may correct only one of the engine start reference value Pstrt and the engine stop reference value Pstp. The requirement is correction of any parameter relating to control of the engine 22 to raise the output power from the engine 22. The drive control routine may thus correct the throttle valve opening to a greater value or correct the target drive point of the engine 22 to have a greater power. In any of such modifications, the correction range may be guarded by a preset upper limit for reduction of the potential vibrations and noise.

The hybrid vehicle 20 of the first embodiment identifies the use of the regular fuel in response to detection of the occurrence of knocking and corrects the engine start reference value Pstrt and the engine stop reference value Pstp to the smaller values and adds the corrective revolution speed ΔN to the target revolution speed Ne* of the engine 22. The requirement is that correction of the engine start reference value Pstrt and the engine stop reference value Pstp and addition of the corrective revolution speed ΔN depend upon detection of a lowered output of the engine 22. For example, the lowered output of the engine 22 may be detected by a variation in temperature of the intake air of the engine 22.

In the hybrid vehicle 20B of the second embodiment, the corrective revolution speed ΔN, which is calculated from the charge-discharge power insufficiency Pbs, is guarded by the preset maximum value ΔNmax. Such upper limit guarding is not essential, but may be omitted if not necessary.

Figure 10:
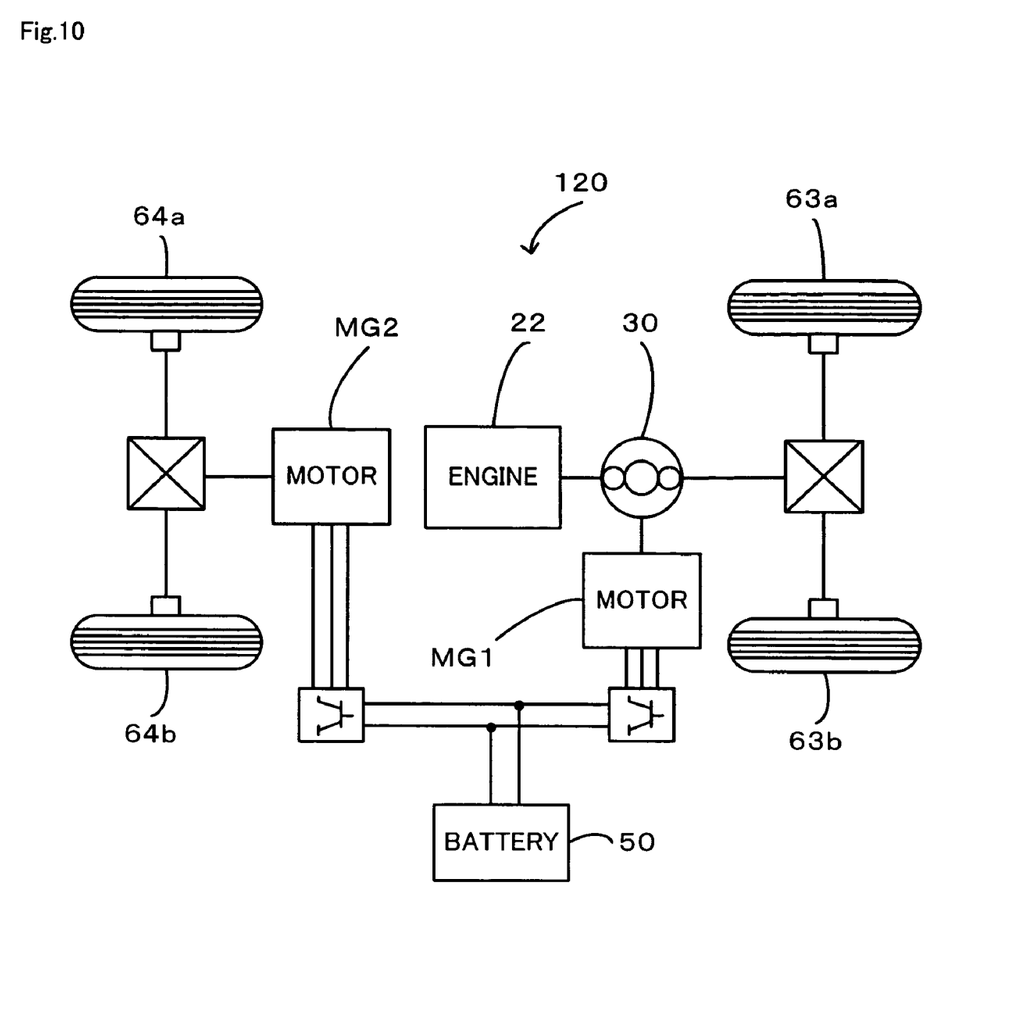
FIG. 10 schematically illustrates the structure of a hybrid vehicle 120 in one modified example.

In the hybrid vehicle 20 of the first embodiment and the hybrid vehicle 20B of the second embodiment, the power of the motor MG2 goes through the change speed operation by the reduction gear 35 and is then output to the ring gear shaft 32a. In a hybrid vehicle 120 of a modified example shown in FIG. 10, the power of the motor MG2 is output to an axle linked with wheels 64a and 64b, which is different from the axle linked with the drive wheels 63a and 63b and connected with the ring gear shaft 32a.

Figure 11:
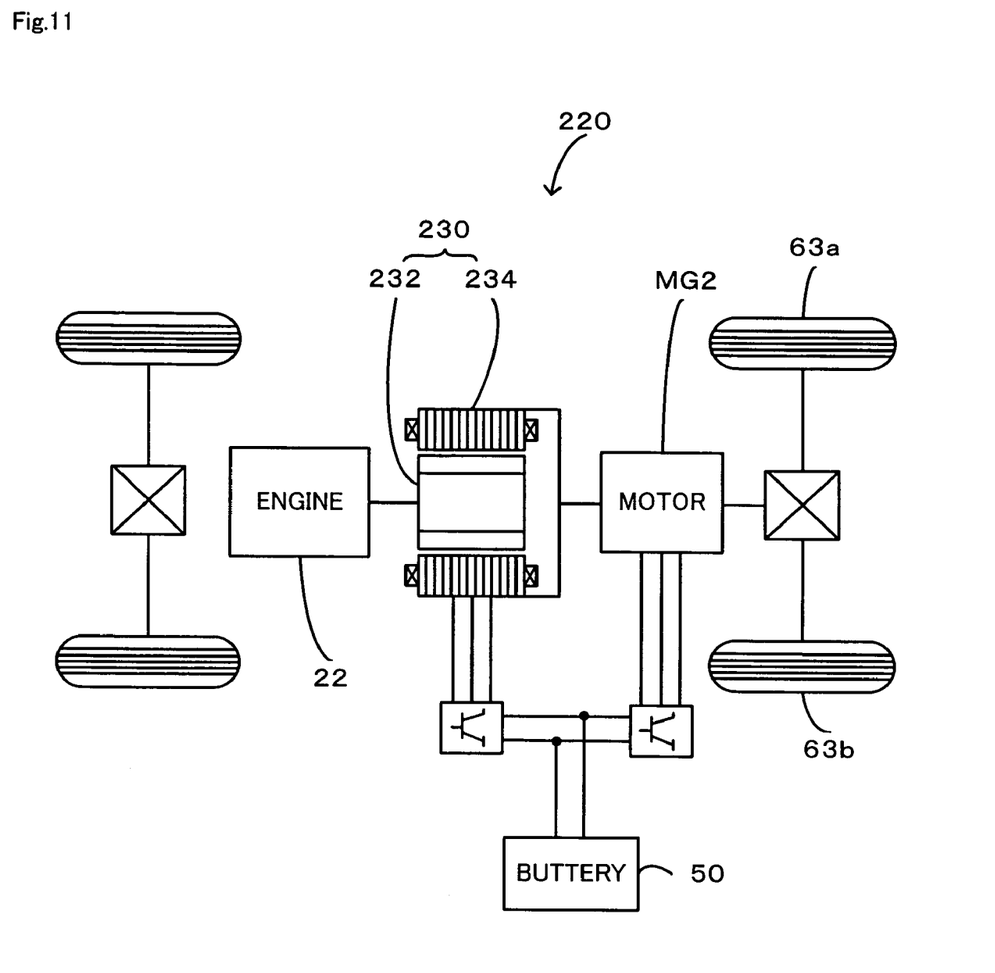
FIG. 11 schematically illustrates the structure of a hybrid vehicle 220 in another modified example.

In the hybrid vehicle 20 of the first embodiment and the hybrid vehicle 20B of the second embodiment, the power of the engine 22 is output via the power distribution integration mechanism 30 to the ring gear shaft 32a functioning as the drive shaft linked with the drive wheels 63a and 63b. In another possible modification of FIG. 11, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The preferred embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2003-360643 filed Oct. 21, 2003 including specification, drawings and claims is incorporated herein by reference in its entirety.

What is claimed is:

1. A power output apparatus that outputs power to a drive shaft, said power output apparatus comprising:
   an internal combustion engine;
   an electric power-mechanical power input-output module that is connected to an output shaft of the internal combustion engine and to the drive shaft and outputs at least part of output power from the internal combustion engine to the drive shaft through input and output of electric power and mechanical power;
   a motor that inputs and outputs power from and to the drive shaft;
   a target drive point setting module that sets a target drive point of the internal combustion engine, based on a power demand required to the drive shaft;
   an output decrease detection module that detects an output decreasing state, where the output power from the internal combustion engine is lower than a power level defined by the target drive point, while the internal combustion engine is under a preset control to be driven at the target drive point; and
   a control module that controls the internal combustion engine, said electric power-mechanical power input-output module, and the motor with a predetermined control parameter, in the case of no detection of the output decreasing state by said output decrease detection module,
   said control module correcting the predetermined control parameter to increase the output power from the internal combustion engine, in the case of detection of the output decreasing state by said output decrease detection module, and controlling the internal combustion engine, said electric power-mechanical power input-output module, and the motor with the corrected control parameter.

2. A power output apparatus in accordance with claim 1, wherein said control module controls a start of the internal combustion engine with a preset start reference value, and corrects the preset start reference value to facilitate the start of the internal combustion engine, in response to detection of the output decreasing state by said output decrease detection module, compared with a state of no detection of the output decreasing state.

3. A power output apparatus in accordance with claim 1, wherein said control module controls a stop of the internal combustion engine with a preset stop reference value, and corrects the preset stop reference value to hinder the stop of the internal combustion engine, in response to detection of the output decreasing state by said output decrease detection module, compared with a state of no detection of the output decreasing state.

4. A power output apparatus in accordance with claim 1, wherein said control module controls a stop of the internal combustion engine with a preset start reference value and a preset stop reference value, and corrects the preset start reference value to facilitate the start of the internal combustion engine while correcting the preset stop reference value to hinder the stop of the internal combustion engine, in response to detection of the output decreasing state by said output decrease detection module, compared with a state of no detection of the output decreasing state.

5. A power output apparatus in accordance with claim 1, wherein said target drive point setting module sets a target revolution speed and a target torque of the internal combustion engine as the target drive point, and
   said control module corrects the target revolution speed of the internal combustion engine to a greater value, in response to detection of the output decreasing state by said output decrease detection module, compared with a state of no detection of the output decreasing state.

6. A power output apparatus in accordance with claim 5, wherein said control module corrects the target revolution speed of the internal combustion engine to make a difference between the non-corrected target revolution speed of the internal combustion engine and the corrected target revolution speed of the internal combustion engine within a specified range.

7. A power output apparatus in accordance with claim 1, wherein said control module corrects an opening of a throttle valve in the internal combustion engine to a greater value, in response to detection of the output decreasing state by said output decrease detection module, compared with a state of no detection of the output decreasing state.

8. A power output apparatus in accordance with claim 7, wherein said control module corrects the opening of the throttle valve in the internal combustion engine to make a difference between the non-corrected opening of the throttle valve and the corrected opening of the throttle valve within a specified range.

9. A power output apparatus in accordance with claim 1, wherein said output decrease detection module senses a start of knocking control of the internal combustion engine to detect the output decreasing state.

10. A power output apparatus in accordance with claim 1, wherein said electric power-mechanical power input-output module comprises:
    a three shaft-type power input-output unit that is connected to three shafts, the output shaft of the internal combustion engine, the drive shaft, and a third shaft, and inputs and outputs power from and to a residual shaft, based on powers input from and output to any two of the three shafts; and
    a generator that inputs and outputs power from and to the third shaft.

11. A power output apparatus in accordance with claim 1, wherein said electric power-mechanical power input-output module comprises a pair-rotor motor, which has a first rotor linked with the output shaft of the internal combustion engine and a second rotor linked with the drive shaft, and outputs at least part of the output power from the internal combustion engine to the drive shaft through input and output of electric power by an electromagnetic action of the first rotor and the second rotor.

12. An automobile, said automobile comprising:
    an internal combustion engine;
    an electric power-mechanical power input-output module that is connected to an output shaft of the internal combustion engine and to a drive shaft linked with an axle and outputs at least part of output power from the internal combustion engine to the drive shaft through input and output of electric power and mechanical power;
a motor that inputs and outputs power from and to the drive shaft;
a target drive point setting module that sets a target drive point of the internal combustion engine, based on a power demand required to the drive shaft;
an output decrease detection module that detects an output decreasing state, where the output power from the internal combustion engine is lower than a power level defined by the target drive point, while the internal combustion engine is under a preset control to be driven at the target drive point; and
a control module that controls the internal combustion engine, said electric power-mechanical power input-output module, and the motor with a predetermined control parameter, in the case of no detection of the output decreasing state by said output decrease detection module,
said control module correcting the predetermined control parameter to increase the output power from the internal combustion engine, in the case of detection of the output decreasing state by said output decrease detection module, and controlling the internal combustion engine, said electric power-mechanical power input-output module, and the motor with the corrected control parameter.

13. An automobile in accordance with claim 12, wherein said control module controls a stop of the internal combustion engine with a preset start reference value and a preset stop reference value, and corrects the preset start reference value to facilitate the start of the internal combustion engine while correcting the preset stop reference value to hinder the stop of the internal combustion engine, in response to detection of the output decreasing state by said output decrease detection module, compared with a state of no detection of the output decreasing state.

14. An automobile in accordance with claim 12, wherein said target drive point setting module sets a target revolution speed and a target torque of the internal combustion engine as the target drive point, and
said control module corrects the target revolution speed of the internal combustion engine to a greater value, in response to detection of the output decreasing state by said output decrease detection module, compared with a state of no detection of the output decreasing state.

15. An automobile in accordance with claim 12, wherein said control module corrects an opening of a throttle valve in the internal combustion engine to a greater value, in response to detection of the output decreasing state by said output decrease detection module, compared with a state of no detection of the output decreasing state.

16. An automobile in accordance with claim 12, wherein said output decrease detection module senses a start of knocking control of the internal combustion engine to detect the output decreasing state.

17. An automobile in accordance with claim 12, wherein said electric power-mechanical power input-output module comprises:
a three shaft-type power input-output unit that is connected to three shafts, the output shaft of the internal combustion engine, the drive shaft, and a third shaft, and inputs and outputs power from and to a residual shaft, based on powers input from and output to any two of the three shafts; and
a generator that inputs and outputs power from and to the third shaft.

18. An automobile in accordance with claim 12, wherein said electric power-mechanical power input-output module comprises a pair-rotor motor, which has a first rotor linked with the output shaft of the internal combustion engine and a second rotor linked with the drive shaft, and outputs at least part of the output power from the internal combustion engine to the drive shaft through input and output of electric power by an electromagnetic action of the first rotor and the second rotor.

19. A control method of a power output apparatus, said power output apparatus being equipped with an internal combustion engine, an electric power-mechanical power input-output module that is connected to an output shaft of the internal combustion engine and to a drive shaft and outputs at least part of output power from the internal combustion engine to the drive shaft through input and output of electric power and mechanical power, and a motor that inputs and outputs power from and to the drive shaft,
said control method comprising the steps of:
(a) setting a target drive point of the internal combustion engine, based on a power demand required to the drive shaft;
(b) detecting an output decreasing state, where the output power from the internal combustion engine is lower than a power level defined by the target drive point, while the internal combustion engine is under a preset control to be driven at the target drive point; and
(c) controlling the internal combustion engine, said electric power-mechanical power input-output module, and the motor with a predetermined control parameter, in the case of no detection of the output decreasing state by step (b), while correcting the predetermined control parameter to increase the output power from the internal combustion engine, in the case of detection of the output decreasing state by step (b), and controlling the internal combustion engine, said electric power-mechanical power input-output module, and the motor with the corrected control parameter.

* * * * *